H. McTAVISH.
HOLDBACK DEVICE FOR VEHICLE POLES.
APPLICATION FILED APR. 15, 1918.
1,297,209.
Patented Mar. 11, 1919.
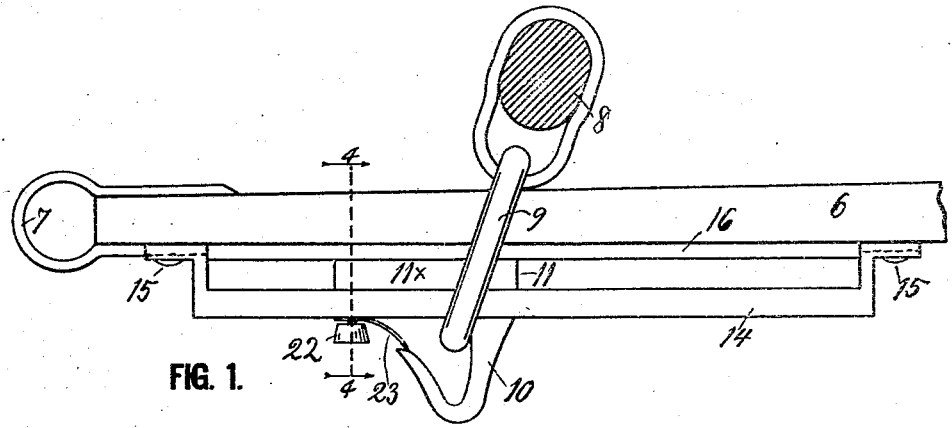
FIG. 1.
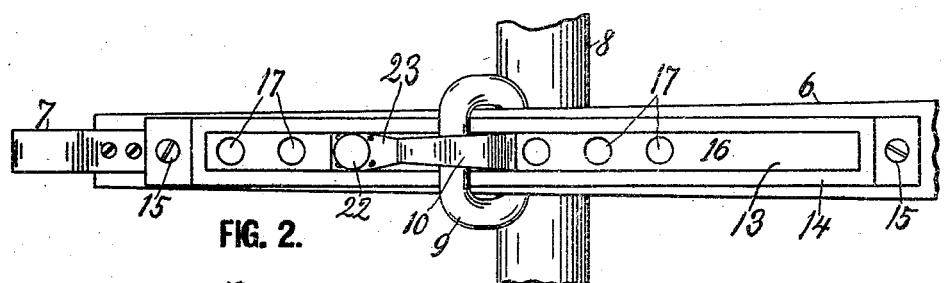
FIG. 2.
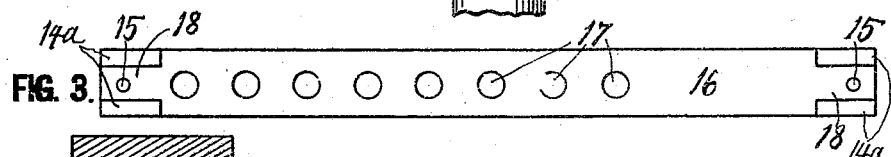
FIG. 3.
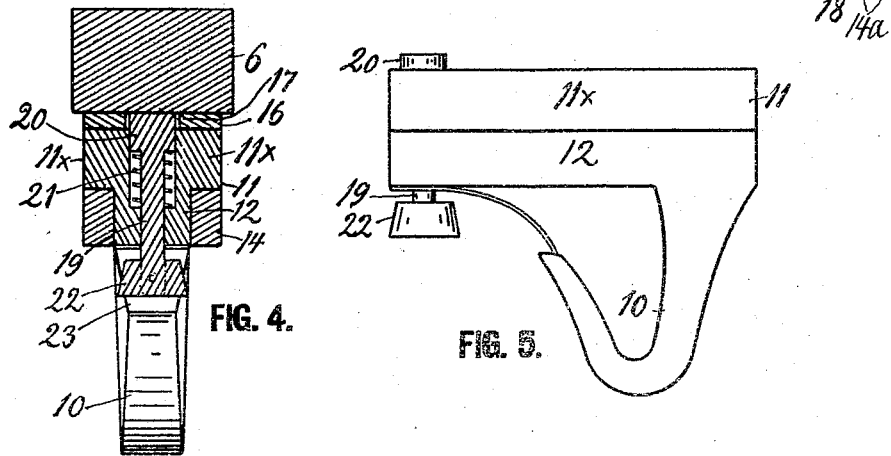
FIG. 4.
FIG. 5.
INVENTOR.
HARRY McTAVISH
BY HIS ATTORNEY:
A.M. Carlsen.

UNITED STATES PATENT OFFICE.

HARRY McTAVISH, OF ELDON, PRINCE EDWARD ISLAND, CANADA.

HOLDBACK DEVICE FOR VEHICLE-POLES.

1,297,209.   Specification of Letters Patent.   Patented Mar. 11, 1919.

Application filed April 15, 1918. Serial No. 228,759.

*To all whom it may concern:*

Be it known that I, HARRY McTAVISH, a subject of the King of Great Britain, residing at Eldon, Prince Edward Island, Canada, have invented a new and useful Holdback Device for Vehicle-Poles, of which the following is a specification.

My invention relates to hold-back irons for vehicle poles, and the object is to provide a safe and convenient device for holding a neck yoke at the desired point upon the tongue or pole of a vehicle, said device being so constructed that the neck yoke may be readily adjusted back and forth on the pole as may be required for small and for big horses hitched to the doubletree mounted at a certain point upon the rear part of the pole.

In the accompanying drawing, Figure 1 is a side view of the front portion of a vehicle pole equipped with my invention, and a neck yoke in section placed upon the pole and engaged by the device. Fig. 2 is a bottom view of what is shown in Fig. 1. Fig. 3 is a top view of the device detached from the pole. Fig. 4 is a section on the line 4—4 in Fig. 1. Fig. 5 is a detail side view of a sliding block and hook forming essential parts of the device.

Referring to the drawing by reference numerals, 6 designates a tongue or pole extending forward from a vehicle (not shown) and having usually fixed at its front end an eye 7 to which an auxiliary team may be hitched when so required. 8 represents a neck-yoke which is usually provided with an eye or ring 9 which when the draft animals are to hold back against the vehicle engages a hook 10 or similar device permanently fixed to the underside of the pole; but in my device said hook is fixed on a block 11, which has a downward rib 12 guided in a slot 13 of a longitudinal frame 14, whose ends are offset upwardly and secured by screws 15 to the pole. The block is further guided by having its side wings 11ˣ placed between the frame bar 14 and a metal plate or strip 16. The latter has its body provided with a series of apertures 17, and its ends 18 inserted in the end lugs 14ᵃ of the frame 14 and secured by the same screws, or bolts 15, that hold the said frame.

Mounted to slide vertically in the block 11 is a bolt 19 having an enlarged upper end 20 supported by a coil spring 21 so as to readily engage in any of the apertures 17. The lower end of the bolt is provided with a catch or head 22, which the operator takes hold of and pulls downward when he desires to disengage the bolt from the apertures 17 while he moves the block to the desired place in the frame, where it is again locked by the pin as soon as the head 22 is released.

Secured to the block is also a spring tongue 23, which serves to prevent accidental escape of the ring 9 from the hook 10.

The device is also designed as a hold-back iron on vehicle shafts at the points where the hold-back straps are attached to the shafts.

What I claim is:—

1. In a hold-back device for neck yokes on vehicle poles and tongues, a metal strip or frame plate perforated along its body and having near each end a screw hole, a second metal plate having screw holes registering with those in the frame plate, and screws through said holes for securing the two plates together and to the under side of a pole, said second plate having its body offset downwardly near the screws and spaced in parallel relation to the frame plate below the same, said body provided with a slot along its middle, a block guided to slide between said two plates and in said slot and having near its rear end a fixed hook projecting down through the slot, and near its front end inserted a vertically slidable spring-pressed pin with a finger catch on it and arranged to interlock with the different perforation in the frame plate.

2. The structure specified in claim 1, and a spring arm secured to the block forward of its hook and normally bearing with its free end against the inner side of the point of the hook, so as to positively prevent escape of the neck yoke ring from the hook and also prevent damage to the spring arm from bending it too much.

In testimony whereof I affix my signature.

HARRY McTAVISH.

Copies of this patent may be obtained for five cents each, by addressing the "Commissioner of Patents, Washington, D. C."